United States Patent Office 2,723,991
Patented Nov. 15, 1955

2,723,991

PRODUCTION OF N-ARYLMALEAMIC ACIDS

Carlton A. Sears and Donald J. Wilson, Stamford, Conn., assignors to American Cyanamid Company, New York, N. Y., a corporation of Maine No Drawing. Application April 28, 1953,
Serial No. 351,734

14 Claims. (Cl. 260—518)

This invention relates to the production of N-arylmaleamic acids by the reaction of maleic anhydride with primary aromatic amines. The principal object of the invention is the provision of an improved manufacturing process for N-arylmaleamic acids wherein the condensation of the arylamine with maleic anhydride is carried out in an aqueous medium with formation of the resulting N-arylmaleamic acid as an aqueous suspension from which the product can be recovered directly by filtration, decantation or other applicable filtration procedures.

The process of our invention is based on the discovery that maleic anhydride will condense directly with primary aromatic amines that are in aqueous solution or suspension with the formation of the corresponding N-arylmaleamic acids in good yields. Inasmuch as the N-arylmaleamic acids so produced are insoluble in water and in water-alcohol mixtures that are solvents for primary aromatic amines, they are formed as an aqueous suspension and can be recovered directly in a high degree of purity. Commercially pure products are obtained simply by filtering the reaction mixture and washing the filter cake with a solvent for unreacted maleic acid and aromatic amine, such as with a water-alcohol mixture, followed by air drying. If desired, however, the freshly formed product can be redissolved in ethanol or other suitable solvent and recrystallized, whereby highly purified products are obtained.

Condensation between maleic anhydride and a primary aromatic amine can be carried out in accordance with the process of our invention either when the amine is dissolved in the aqueous reaction medium or when it is emulsified therein. Good yields of N-arylmaleamic acids on the order of 80–95% of theory are obtained in either case, and in both cases the condensation product is formed in a finely divided, crystalline condition that permits ready filtration and washing. In producing the mononuclear N-arylmaleamic acids, however, and particularly in the production of N-phenylmaleamic acid, we prefer the process wherein the amine is dissolved in an aqueous solvent, such as an alcohol-water mixture, since considerably higher yields are obtained.

An additional important feature of our invention consists in the use of alkaline condensation catalysts such as the alkali metal hydroxides, carbonates and bicarbonates to increase the rate and completeness of the condensation reaction between the amine and the maleic anhydride. We find that when small amounts of such catalysts on the order of about 1–5% of the weight of the aromatic amine are used, the yields of N-arylmaleamic acid are considerably improved. These catalysts are dissolved in the aqueous dispersing medium before the condensation reaction is carried out.

Any primary aromatic monoamine may be condensed with maleic anhydride by the process of our invention to form the corresponding N-arylmaleamic acid. Aniline and substituted mononuclear aromatic amines such as ortho-toluidine, meta-toluidine, para-toluidine and the corresponding ethyl-, propyl- and higher alkyl-substituted primary phenylamines may be used; the various isomeric xylidines and commercial mixtures of these and other trialkyl-substituted primary phenylamines may also be employed. Polynuclear aromatic monoamines such as alpha-naphthol, beta-naphthol and their homologs can likewise be reacted with maleic anhydride by the process of our invention to produce the corresponding N-naphthylmaleamic acids in good yields. It will be understood, therefore, that the process of our invention is general in character and can be applied to the condensation of any primary aromatic monoamine with maleic anhydride.

As is indicated above, the aromatic monoamine may be present in the reaction mixture either as a solution in an aqueous solvent or in the form of an aqueous emulsion. The preferred solvent is a mixture of water and a water-alcohol lower primary aliphatic alcohol such as methanol, ethanol, propanol, isopropanol or tertiary-butanol. The proportion of alcohol to water is preferably that which will permit formation of a 15%–60% solution of the amine without, however, dissolving more than about 5–10% of the corresponding N-phenylmaleamic acid, since this product is to be produced as an aqueous suspension or slurry from which it can be recovered directly by filtration procedures. The quantity of alcohol in the solvent will therefore vary with the degree of water-solubility of the particular amine; thus beta-naphthylamine, being completely soluble in hot water, requires no alcohol whereas as much as 50%–60% of ethanol or isopropanol can be used to advantage in preparing and reacting a solution of aniline. The optimum concentration of alcohol to be used with other primary aromatic amines can easily be determined from their known water- and alcohol-solubilities.

Any suitable emulsification procedure can be employed when the aromatic amine is reacted in the form of an emulsion. Preferably a small quantity of an emulsifying agent, such as a nonionic agent prepared by condensing ethylene oxide with a higher aliphatic alcohol or an alkylphenol, is dissolved in water and the amine is added and emulsified by vigorous agitation. With an aromatic amine which is normally solid the mixture should be heated to a temperature above its melting point in order to obtain the requisite degree of dispersion. The alkaline condensation catalyst may be dissolved in the water before the emulsification or it may be added later.

In carrying out the condensation reaction the maleic anhydride is preferably added to the arylamine dispersion either in molten condition or as a finely divided solid. The reaction temperature is not critical, and any suitable temperature may be employed; however, since the condensation reaction is exothermic, it is preferable to use a water-jacketed reaction kettle supplied with cooling water to prevent boiling. The maleic anhydride is usually added slowly for the same reason. Preferably a quantity of maleic anhydride is added that is the equimolecular equivalent of the amine; while a somewhat greater amount may be added it does not materially improve the yield. After the maleic anhydride addition the mixture may be allowed to react for from 30 minutes to 4 hours or longer to bring the condensation reaction to completion, after which the mixture is preferably cooled to room temperature or lower to ensure the maximum separation of N-arylmaleamic acid from solution. The reaction mixture is then filtered and the filter cake is washed with water or a water-alcohol mixture to remove unreacted materials, after which it may be dried by any suitable procedure.

The invention will be further illustrated by the following specific examples. It should be understood however that although these examples may describe in detail some of the more specific features of the invention, they are

Example 1

A glass-lined reaction kettle equipped with an agitator and surrounded by a jacket for cooling and heating water was charged with a mixture of 6 liters of water and 6 liters of isopropanol and 3.72 kg. (40 mols) of aniline were added and dissolved, followed by 80 grams of sodium hydroxide. Agitation was continued while 3.92 kg. (40 mols) of molten maleic anhydride was added through a steam-heated dropping funnel at a rate to keep the reaction temperature at 70°–75° C., the addition time being about 50–60 minutes. The resulting slurry was stirred for an additional hour at 60°–70° C. to complete the reaction, cooled to room temperature and discharged onto a filter. The slurry was very fluid and was easily discharged from the kettle.

The product was filtered and washed with four liters of a mixture of equal volumes of water and isopropanol. Due to its crystalline character the filtration and washing proceeded rapidly and the filter cake was easily air-dried. The yield was 7.13 kg. (93.7%) of a light yellow crystalline material melting at 198°–199° C.

Example 2

Results similar to those of Example 1 were obtained when a water emulsion of aniline was neutralized with maleic anhydride. The kettle was charged with 10 liters of water containing 40 grams of the condensation product of tertiary octylphenol with 5 mols of ethylene oxide as a nonionic emulsifying agent and 80 grams of sodium hydroxide as condensation catalyst. The same quantity of aniline (3.72 kg.) was added and the mixture was agitated until a uniform emulsion was obtained. The temperature was then raised to 50° C. and 3.92 kg. of molten maleic anhydride were added with continued agitation at 50°–55° C. during two hours and 50 minutes. The resulting slurry was allowed to stand overnight after which it was neutralized by adding 11% sulfuric acid, diluted with four liters of water, filtered and washed with water and air dried. The yield was 6.54 kg. (85.4%) of fine, light yellow powder melting at 192°–193° C.

Example 3

A charge consisting of 4.28 kg. (40 mols) of ortho-toluidine in 12 liters of water containing 35 grams of the emulsifying agent and 80 grams of sodium hydroxide was emulsified and maintained at 60°–65° C. as 3.92 kg. of molten maleic anhydride were added during 3 hours with continued agitation. The mixture was allowed to stand overnight, neutralized with sulfuric acid, diluted with water and filtered and washed as described in Example 2. The yield was 6.82 kg. (83.2%) of a yellow powder of fine particle size.

Example 4

The reaction kettle was charged with a solution of 3.21 kg. of para-toluidine in 10 liters of a mixture of equal volumes of ethyl alcohol and water containing 60 grams of sodium hydroxide and agitated as 2.94 kg. of molten maleic anhydride were added during 40–45 minutes at 60–70° C. Agitation was continued for one hour longer after which the slurry was cooled to 20° C., filtered and the filter cake washed with a water-alcohol mixture. The product, weighing 5.35 kg., was obtained in the form of light yellow needles melting at 201°–202° C.

Example 5

A solution of 86 grams of beta-naphthylamine in 600 cc. of water containing 4 grams of sodium hydroxide was prepared at 60° C. This solution was charged into a flask equipped with a stirrer and agitated while 60 grams of molten maleic anhydride were added slowly, the reaction temperature being maintained at 55–60° C. Agitation was continued for an additional 30 minutes after which the resulting slurry was cooled to room temperature, filtered and washed with cold 25% ethyl alcohol. The product after recrystallization from ethyl alcohol was obtained in the form of yellow needles melting at 200°–201° C.

Example 6

Fifty grams of alpha-naphthylamine were suspended in 200 cc. of water containing 2 grams of sodium hydroxide and 1 gram of the octylphenol-ethylene oxide condensation product previously described and the mixture was heated to 65° C. and agitated until a uniform emulsion was obtained after which 37 grams of molten maleic anhydride were added during 30 minutes. The mixture was agitated at 65°–70° C. for 45 minutes, cooled to room temperature, filtered and then the filter cake was washed with cold 40% ethyl alcohol. The product, weighing 70 grams, was obtained as a fine yellow powder.

Example 7

A two-liter reaction flask equipped with an agitator was charged with one liter of water containing 4 grams of the condensation product of tertiary octylphenol with 5 mols of ethylene oxide and 372 grams of aniline and the mixture was emulsified by vigorous stirring. Four mols (392 grams) of finely ground maleic anhydride was then added slowly with continuous agitation and the mixture was stirred for 35 minutes longer while the temperature reached 72° C. and gradually decreased to 60° C. The mixture was then filtered at 60° C. and the filter cake was washed with 200 cc. of water and air dried. The yield was 618 grams (81%) of a very fine, light yellow powder melting at 198°–199° C.

What we claim is:

1. A method for the production of N-arylmaleamic acids which comprises reacting maleic anhydride with an aqueous dispersion of a primary aromatic monoamine and thereby forming an aqueous suspension of an N-arylmaleamic acid and filtering off and recovering the N-arylmaleamic acid so produced.

2. A method for the production of N-arylmaleamic acids which comprises preparing an aqueous dispersion of a primary aromatic monoamine, adding an equimolecular quantity of maleic anhydride thereto and reacting the mixture to form an aqueous suspension of an N-arylmaleamic acid, and filtering off and recovering the N-arylmaleamic acid so produced.

3. A method for the production of N-arylmaleamic acids which comprises reacting maleic anhydride with an aqueous dispersion of a primary aromatic monoamine in the presence of a basic condensation catalyst and thereby forming an aqueous suspension of an N-arylmaleamic acid and filtering off and recovering the N-arylmaleamic acid so produced.

4. A method for the production of mononuclear N-arylmaleamic acids which comprises reacting maleic anhydride with an aqueous dispersion of a primary mononuclear aromatic monoamine and thereby forming an aqueous suspension of a mononuclear N-arylmaleamic acid and filtering off and recovering the N-arylmaleamic acid so produced.

5. A method for the production of mononuclear N-arylmaleamic acids which comprises preparing an aqueous dispersion of a primary mononuclear aromatic monoamine, adding an equimolecular quantity of maleic anhydride thereto and reacting the mixture to form an aqueous suspension of a mononuclear N-arylmaleamic acid and filtering off and recovering the N-arylmaleamic acid so produced.

6. A method for the production of mononuclear N-arylmaleamic acids which comprises reacting maleic anhydride with an aqueous dispersion of a primary mononuclear aromatic monoamine in the presence of a basic condensation catalyst and thereby forming an aqueous suspension of a mononuclear N-arylmaleamic acid and filtering off and recovering the N-arylmaleamic acid so produced.

7. A method for the production of N-arylmaleamic acids which comprises preparing a solution of a primary aromatic monoamine in an aqueous solvent therefor, adding an equimolecular quantity of maleic anhydride thereto, reacting the mixture and thereby forming an aqueous suspension of an N-arylmaleamic acid and filtering off and recovering the N-arylmaleamic acid so produced.

8. A method for the production of N-arylmaleamic acids which comprises preparing a solution of a primary aromatic monoamine in an aqueous solvent therefor, said solution having dissolved therein a basic condensation catalyst, adding an equimolecular quantity of maleic anhydride thereto, reacting the mixture and thereby forming an aqueous suspension of an N-arylmaleamic acid and filtering off and recovering the N-arylmaleamic acid so produced.

9. A method for the production of N-phenylmaleamic acid which comprises dissolving aniline in a mixture of water and a water-soluble lower aliphatic monohydric alcohol, adding an equimolecular quantity of maleic anhydride thereto, reacting the mixture and thereby forming an aqueous suspension of N-phenylmaleamic acid, and filtering off and recovering the N-phenylmaleamic acid so produced.

10. A method for the production of N-phenylmaleamic acid which comprises dissolving aniline and a basic condensation catalyst in a mixture of water and a water-soluble lower aliphatic monohydric alcohol, adding an equimolecular quantity of maleic anhydride thereto, reacting the mixture and thereby forming an aqueous suspension of N-phenylmaleamic acid, and filtering off and recovering the N-phenylmaleamic acid so produced.

11. A method for the production of N-arylmaleamic acids which comprises preparing an aqueous emulsion of a water-insoluble primary aromatic monoamine, adding an equimolecular quantity of maleic anhydride thereto, reacting the mixture and thereby forming an aqueous suspension of an N-arylmaleamic acid and filtering off and recovering the N-arylmaleamic acid so produced.

12. A method for the production of N-arylmaleamic acids which comprises emulsifying a water-insoluble primary aromatic monoamine in water having a basic condensation catalyst dissolved therein, adding an equimolecular quantity of maleic anhydride thereto, reacting the mixture and thereby forming an aqueous suspension of an N-arylmaleamic acid and filtering off and recovering the N-arylmaleamic acid so produced.

13. A method for the production of N-phenylmaleamic acid which comprises emulsifying aniline in water, adding to the emulsion an equimolecular quantity of maleic anhydride, reacting the mixture and thereby forming an aqueous suspension of N-phenylmaleamic acid and filtering off and recovering the N-phenylmaleamic acid so produced.

14. A method for the production of N-phenylmaleamic acid which comprises preparing an emulsion of aniline in water having a basic condensation catalyst dissolved therein, adding an equimolecular quantity of maleic anhydride thereto, reacting the mixture and thereby forming an aqueous suspension of N-phenylmaleamic acid and filtering off and recovering the N-phenylmaleamic acid so produced.

References Cited in the file of this patent

UNITED STATES PATENTS

| 2,274,716 | Lyford | Mar. 3, 1942 |
| 2,383,130 | Jaeger et al. | Aug. 21, 1945 |

FOREIGN PATENTS

| 95,060 | Germany | Nov. 6, 1897 |
| 680,839 | France | Jan. 23, 1930 |